(12) United States Patent　　(10) Patent No.: US 7,183,917 B2
Piccoli et al.　　(45) Date of Patent: Feb. 27, 2007

(54) EAS/RFID IDENTIFICATION HARD TAGS

(75) Inventors: Anthony F. Piccoli, Audubon, NJ (US); Gary T. Mazoki, Sewell, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 444 days.

(21) Appl. No.: 10/848,339

(22) Filed: May 18, 2004

(65) Prior Publication Data

US 2004/0233042 A1　Nov. 25, 2004

Related U.S. Application Data

(60) Provisional application No. 60/471,848, filed on May 19, 2003.

(51) Int. Cl.
　　*G08B 13/14*　　(2006.01)
(52) U.S. Cl. ............... 340/572.1; 340/10.1; 340/572.5
(58) Field of Classification Search ............ 340/572.1, 340/10.1, 10.3, 10.42, 572.3, 572.5, 505, 340/568.1, 539.1, 539.3
See application file for complete search history.

(56) References Cited

U.S. PATENT DOCUMENTS

| | | |
|---|---|---|
| 3,696,379 A | 10/1972 | Minasy |
| 3,720,940 A | 3/1973 | Fox et al. |
| 4,206,453 A | 6/1980 | Williamson |
| 4,481,428 A | 11/1984 | Charlot, Jr. |
| 4,667,185 A | 5/1987 | Nourse et al. |
| 4,940,968 A | 7/1990 | De Nood |
| 5,019,801 A | 5/1991 | Anderson, III |
| 5,184,111 A | 2/1993 | Pichl |
| 5,204,681 A | 4/1993 | Greene |
| 5,371,490 A | 12/1994 | Martinides |
| 5,381,137 A | 1/1995 | Ghaem et al. |
| 5,444,223 A | 8/1995 | Blama |
| 5,446,447 A | 8/1995 | Carney et al. |
| 5,510,769 A | 4/1996 | Kafjez et al. |
| 5,519,381 A | 5/1996 | Marsh et al. |
| 5,581,257 A | 12/1996 | Greene et al. |
| 5,604,486 A | 2/1997 | Lauro et al. |
| 5,726,628 A | 3/1998 | Yoo |
| 5,793,200 A | 8/1998 | Berrill |
| 5,821,859 A | 10/1998 | Schrott et al. |
| 5,939,984 A | 8/1999 | Brady et al. |
| 5,955,951 A | 9/1999 | Wischerop et al. |
| 5,973,600 A | 10/1999 | Mosher, Jr. |
| 6,011,474 A | 1/2000 | Coffey et al. |
| 6,025,780 A | 2/2000 | Bowers et al. |

(Continued)

OTHER PUBLICATIONS

International Search Report dated Oct. 20, 2004 for corresponding PCT/US2004/015829.

*Primary Examiner*—Anh V. La
(74) *Attorney, Agent, or Firm*—Caesar, Rivise, Bernstein, Cohen & Pokotilow, Ltd.

(57) ABSTRACT

A re-usable identification tag that includes a combination of RFID (radio frequency identification) elements and EAS (electronic article surveillance) elements, or multiple RFID elements without an EAS element, or multiple EAS elements without RFID elements. Systems and methods for tracking or detecting a re-usable identification tag having multiple elements therein to correspond with multiple detection zones such that as the re-usable tag moves from one detection zone to another, the tag can be tracked and/or activate an alarm and/or transmit data to a database.

42 Claims, 11 Drawing Sheets

U.S. PATENT DOCUMENTS

| | | |
|---|---|---|
| 6,072,383 A | 6/2000 | Gallagher, II et al. |
| 6,104,311 A | 8/2000 | Lastinger |
| 6,107,910 A | 8/2000 | Nysen |
| 6,121,878 A | 9/2000 | Brady et al. |
| 6,154,137 A | 11/2000 | Goff et al. |
| 6,154,139 A | 11/2000 | Heller |
| 6,169,483 B1 | 1/2001 | Ghaffari et al. |
| 6,259,991 B1 | 7/2001 | Nysen |
| 6,304,169 B1 | 10/2001 | Blama et al. |
| 6,356,197 B1 * | 3/2002 | Patterson et al. ........ 340/572.1 |
| 6,359,444 B1 * | 3/2002 | Grimes ................... 324/633 |
| 6,362,738 B1 | 3/2002 | Vega |
| 6,498,923 B2 | 12/2002 | Ikefuji et al. |
| 6,509,828 B2 | 1/2003 | Bolavage et al. |
| 6,518,887 B2 | 2/2003 | Suzuki et al. |
| 6,580,358 B1 | 6/2003 | Nysen |
| 6,617,962 B1 | 9/2003 | Horwitz et al. |
| 6,696,953 B2 | 2/2004 | Qiu et al. |
| 6,894,614 B2 * | 5/2005 | Eckstein et al. ......... 340/572.1 |
| 2002/0014993 A1 | 2/2002 | Turner et al. |
| 2002/0017993 A1 | 2/2002 | Blama et al. |
| 2002/0021218 A1 | 2/2002 | Qiu et al. |
| 2003/0020613 A1 | 1/2003 | Cosnard |
| 2003/0227385 A1 | 12/2003 | Lancaster |

* cited by examiner

EAS/RFID IDENTIFICATION HARD TAGS

CROSS-REFERENCE TO RELATED APPLICATIONS

This application claims the benefit under § 119(e) of U.S. Provisional application Ser. No. 60/471,848 filed on May 19, 2003 entitled RFID HARD TAGS and whose entire disclosure is incorporated by reference herein.

BACKGROUND OF THE INVENTION

1. Field of the Invention

This invention relates generally to identification tags and, more particularly, to a re-usable identification tag that uses different combinations of RFID elements and EAS elements for tag detection, or a single or a plurality of RFID elements or a plurality of EAS elements, in a re-usable identification tag for use in plural zone detection systems/methods.

2. Description of Related Art

In the electronic article surveillance (EAS) industry, a "hard tag", refers to a re-usable tag which is intended to be removed from an article, e.g., merchandise at the point of sale to be re-used on other merchandise. Hard tags typically have an injection-molded outer casing. This type of tag is typically found in the apparel industry. By way of example only, one type of EAS hard tag is available from Checkpoint Systems, Inc., Thorofare, N.J., and because of its appearance, is referred to as the UFO style, also available in a mini-UFO style, as well as other styles, as can be seen at www.checkpointsystems.com/content/eas/reusable.aspx.

Basically, the UFO style hard tag 1 comprises a housing H in which an EAS element (e.g., a resonant circuit comprising a coil coupled to a capacitor) is contained. The EAS element is tuned to a predetermined frequency, e.g., 8.2 MHz. In addition, the hard tag 1 further includes a detachable portion 4 that comprises a head 5 and pin 6. To secure the hard tag 1 to an article A, the pointed, free end of the pin 6 is passed through the article A and into a passageway (not shown) in the housing H which contains a locking mechanism (not shown), thereby rendering it nearly impossible for someone to separate the detachable portion 4 from the housing H and release the article A. If the article A (with the hard tag 1 attached) is attempted to be removed from the store without being purchased, when the article A/hard tag 1 combination is passed through a surveillance field 7 created by a transmitter 8 (e.g., located in pedestals at the exit of the store) tuned to the same frequency as the EAS element, the EAS element resonates, thereby providing an output signal detectable by a receiver 9 (also located in pedestals at the exit of the store) which in turn sets off an alarm. On the other hand, if the article is properly purchased, the UFO style hard tag 1 is subjected to a magnetic detacher that permits the cashier to remove the pin 6 from the locking mechanism, thereby releasing the detachable portion 4 from the housing and allowing the article A to be free of the tag 1. The UFO style hard tag 1 can then be secured to another store item and thereby re-used.

In addition, there is a growing trend in the wireless identification tag industry to use RFID (radio frequency identification) tags. An RFID tag 10 (see FIG. 3) basically comprises an RFID element formed by an integrated circuit IC and an RFID LC circuit/antenna 12 (e.g., a resonant circuit as shown in FIG. 3A, or an antenna as shown in FIG. 3B) tuned to a predetermined RF frequency. The integrated circuit IC comprises a memory M that has been programmed with information associated with the article (e.g., product ID information such as a serial number, unique identification number, price, etc.). By way of example only, as shown in FIG. 3A, the RFID LC circuit may be similar to the one shown in U.S. Pat. No. 6,025,780 (Bowers et al.) whose entire disclosure is incorporated by reference herein; or, also by way of example only, as shown in FIG. 3B, the RFID antenna may comprise a dipole antenna. When a transmitter emits a signal at the predetermined RF frequency which is received by the tuned tag antenna, the tag 10 emits a signal containing the stored information which is then received by a receiver and the information demodulated from the tag-emitted signal. This information can then be used for, among other things, determining whether to set off an alarm or not. FIG. 3 depicts a reader 14 that comprises the transmitter and receiver for obtaining the information from the RFID tag 10.

However, there remains a need to provide RFID capability in EAS hard tags, as well as to provide multiple RFID capability or multiple EAS capability in EAS hard tags for use in plural zone detection configurations. The present invention fulfills these needs by providing RFID capability in EAS hard tags, or RFID (even plural RFID) capability without EAS capability, or plural EAS capability and systems/methods for implementing plural zone detection systems that use these types of tags.

All references cited herein are incorporated herein by reference in their entireties.

BRIEF SUMMARY OF THE INVENTION

An identification tag adapted for use with an article wherein the identification tag comprises: a housing comprising at least one electronic article surveillance (EAS) element and at least one radio frequency identification (RFID) element, wherein the at least one EAS element (e.g., a resonant circuit, an acousto-magnetic element, a low frequency element, etc.) emits a first detectable signal when subjected to an electromagnetic field of a frequency within a first EAS frequency range (e.g., 5 kHz–14 kHz; or 50 kHz–70 kHz; or 2 MHz–14 MHz) and the at least one RFID element emits a second detectable signal when subjected to an electromagnetic field of a frequency within a first RFID frequency range (e.g., 2 MHz–14 MHz; or 850 MHz–950 MHz; or 2.3 GHz–2.6 GHz).

An identification tag adapted for use with an article wherein the identification tag comprises: a housing comprising at least two radio frequency identification (RFID) elements, each having an RFID integrated circuit comprising a memory containing information associated with the article, and wherein each one of the pair of RFID elements comprises a respective resonant circuit (e.g., an LC circuit) or antenna (e.g., a dipole antenna) tuned to a respective RF frequency; and wherein each of the RFID elements emits a respective detectable signal when subjected to a respective electromagnetic field corresponding to one of the respective RF frequencies.

An identification tag adapted for use with an article wherein the identification tag comprises: a housing comprising: a radio frequency identification (RFID) element wherein the RFID element comprises either a resonant circuit tuned to a first RF frequency or an antenna tuned to a second RF frequency, different from the first RF frequency, and wherein the RFID element comprises an integrated circuit comprising a memory containing information associated with the article; a detachable portion; a releasable securement mechanism (e.g., a spring-loaded, ball/clutch locking device) for releasably securing the housing and the detachable portion together and for securing the identification tag to the article; and wherein the RFID element emits a respective detectable signal when subjected to an electromagnetic field corresponding to the first or second RF frequency, wherein the respective detectable signal contains the information associated with the article.

An identification tag adapted for use with an article wherein the identification tag comprises: a housing comprising at least two electronic article surveillance (EAS) elements, wherein each EAS element is tuned to a respective EAS frequency; and wherein each of the EAS elements emits a respective detectable signal when subjected to a respective electromagnetic field corresponding to one of the respective EAS frequencies.

A system for detecting a re-usable identification tag wherein the system comprises: at least one re-usable identification tag having at least two elements tuned to respective frequencies and wherein the at least one re-usable identification tag is coupled to an article, wherein the first element emits a first detectable signal when subjected to an electromagnetic field of a first frequency and the second element emitting a second detectable signal when subjected to an electromagnetic field of a second frequency different from the first frequency; a first detection zone comprising at least a first transmitter that emits an electromagnetic field of the first frequency and at least a first receiver that detects the first detectable signal when the at least one re-usable identification tag is present at the first detection zone, wherein the first receiver is coupled to an alarm or a database; and a second detection zone comprising at least a second transmitter that emits an electromagnetic field of the second frequency and at least a second receiver that detects the second detectable signal when the at least one re-usable identification tag is present at the second detection zone, and wherein the second receiver is coupled to an alarm or a database.

A method for detecting a re-usable identification tag wherein the method comprises the steps of: providing at least one re-usable identification tag having at least two elements tuned to respective frequencies and wherein the at least one re-usable identification tag is coupled to an article, wherein the first element emits a first detectable signal when subjected to an electromagnetic field of a first frequency and the second element emits a second detectable signal when subjected to an electromagnetic field of a second frequency different from the first frequency; detecting the first detectable signal by at least a first receiver whenever the at least one re-usable identification tag is at a first detection zone and emits the first detectable signal when at least a first transmitter emits an electromagnetic field of the first frequency in the first detection zone; activating an alarm by, or transmitting a status signal or data to a database from, the first receiver when the first detectable signal is detected; detecting the second detectable signal by at least a second receiver whenever the at least one re-usable identification tag is at a second detection zone and emits the second detectable signal when at least a second transmitter emits an electromagnetic field of the second frequency in the second detection zone; and activating the alarm by, or transmitting a status signal or data to the database from, the second receiver when the second detectable signal is detected.

A system for detecting a re-usable identification tag in at least two environments (e.g., a first retail environment and a second retail environment, warehouse, etc.) wherein the system comprises: at least one re-usable identification tag having at least two elements tuned to respective frequencies and wherein the at least one re-usable identification tag is coupled to an article, wherein the first element emits a first detectable signal when subjected to an electromagnetic field of a first frequency and the second element emits a second detectable signal when subjected to an electromagnetic field of a second frequency different from the first frequency; a first detection zone within a first environment comprising at least a first transmitter that emits an electromagnetic field of the first frequency and at least a first receiver that detects the first detectable signal when the at least one re-usable identification tag is present at the first detection zone, wherein the first receiver is coupled to an alarm or a database; and a second detection zone within the second environment comprises at least a second transmitter that emits an electromagnetic field of the second frequency and at least a second receiver that detects the second detectable signal when the at least one re-usable identification tag is present at the second detection zone, wherein the second receiver is coupled to an alarm or a database.

A method for detecting a re-usable identification tag with at least two environments (e.g., a retail environment, a warehouse, plural retail environments or warehouses, etc.) wherein the method comprises the steps of: providing at least one re-usable identification tag having at least two elements tuned to respective frequencies and wherein the at least one re-usable identification tag is coupled to an article, wherein the first element emits a first detectable signal when subjected to an electromagnetic field of a first frequency and the second element emits a second detectable signal when subjected to an electromagnetic field of a second frequency different from the first frequency; detecting the first detectable signal by at least a first receiver whenever the at least one re-usable identification tag is at a first detection zone of a first environment and emits the first detectable signal when at least a first transmitter emits an electromagnetic field of the first frequency in the first detection zone; activating an alarm by, or transmitting a status signal or data to a database from, the first receiver when the first detectable signal is detected; detecting the second detectable signal by at least a second receiver whenever the at least one re-usable identification tag is at a second detection zone in a second environment and emits the second detectable signal when at least a second transmitter emits an electromagnetic field of the second frequency in the second detection zone; and activating the alarm by, or transmitting a status signal or data to the database from, the second receiver when the second detectable signal is detected.

An identification tag comprising a plurality of elements, each tuned to a respective frequency, for use in at least one environment (e.g., a retail environment, a warehouse, plural retail environments or warehouses, etc.) having at least one transmitter/receiver pair tuned to a respective frequency, and wherein the identification tag comprises at least one element that is tuned to a frequency of the at least one transmitter/receiver pair.

BRIEF DESCRIPTION OF THE DRAWINGS

The following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

element and the second element $E_2$ may comprise an RFID element. Alternatively, the first element $E_1$ and second element $E_2$ may comprise EAS elements only, or both may comprise RFID elements only; or there may be any combination of EAS elements and RFID elements (e.g., elements $E_3 \ldots E_n$.)

The EAS elements of the hard tag 20 may operate in any one of the following designated EAS frequency ranges and the RFID elements may operate in any one of the following designated RFID frequency ranges:

| EAS Operation | | RFID Operation | |
|---|---|---|---|
| Low Frequency (LF) | 5 kHz–14 kHz | High Frequency (HF) | 2 MHz–14 MHz |
| Acousto-Magnetic (AM) | 50 kHz–70 kHz | Ultrahigh Frequency (UHF) | 850 MHz–950 MHz |
| Radio Frequency (RF) | 2 MHz–14 MHz | Microwave Frequency | 2.3 GHz–2.6 GHz |

Figure 4:
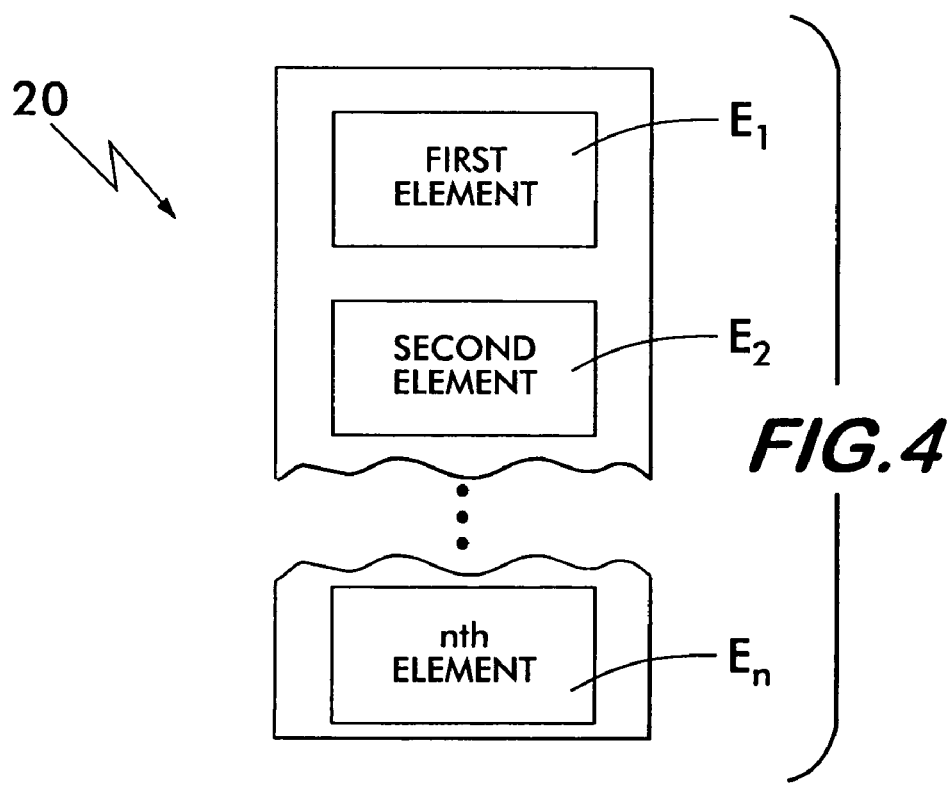
Figure 4A:
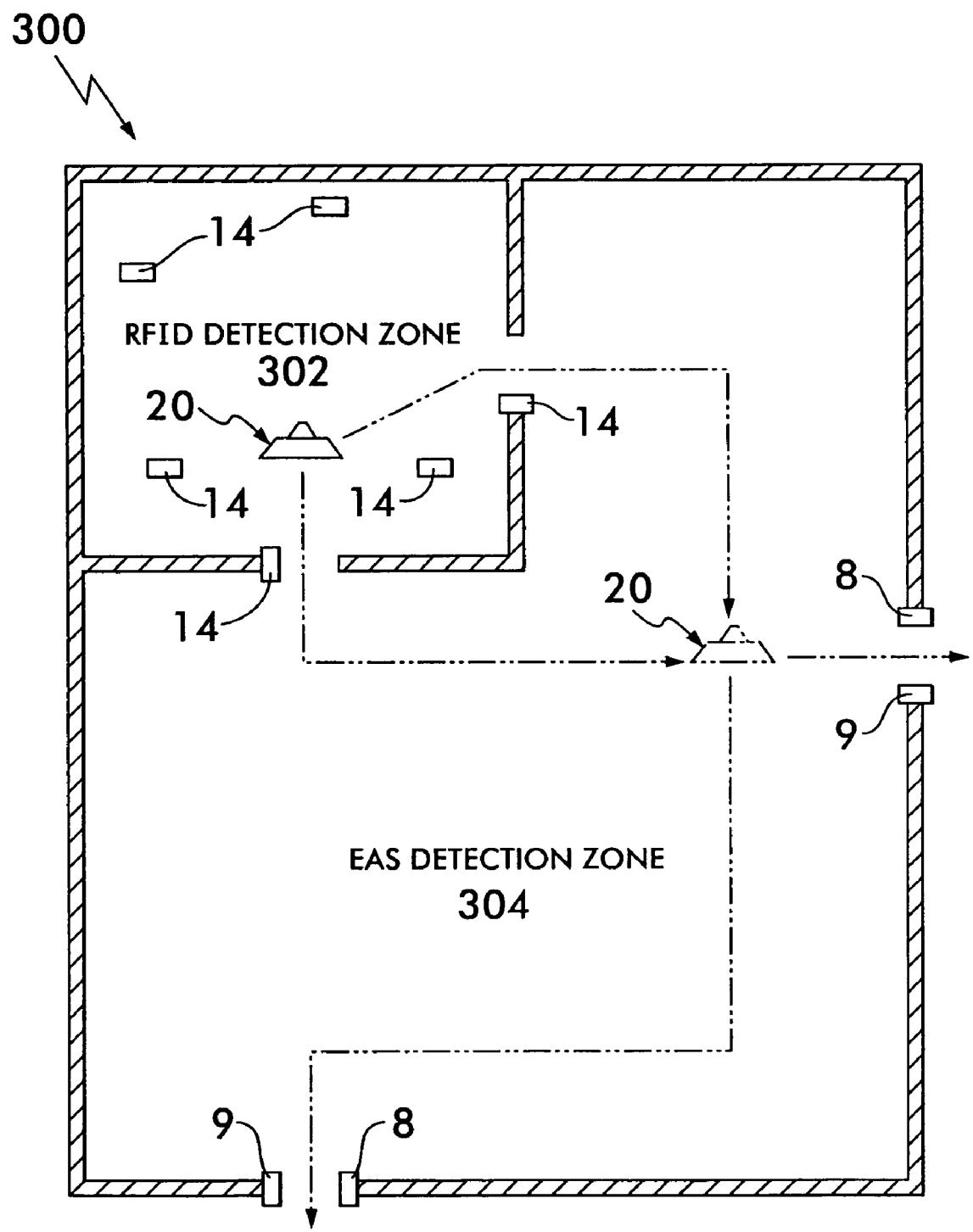
Figure 4B:
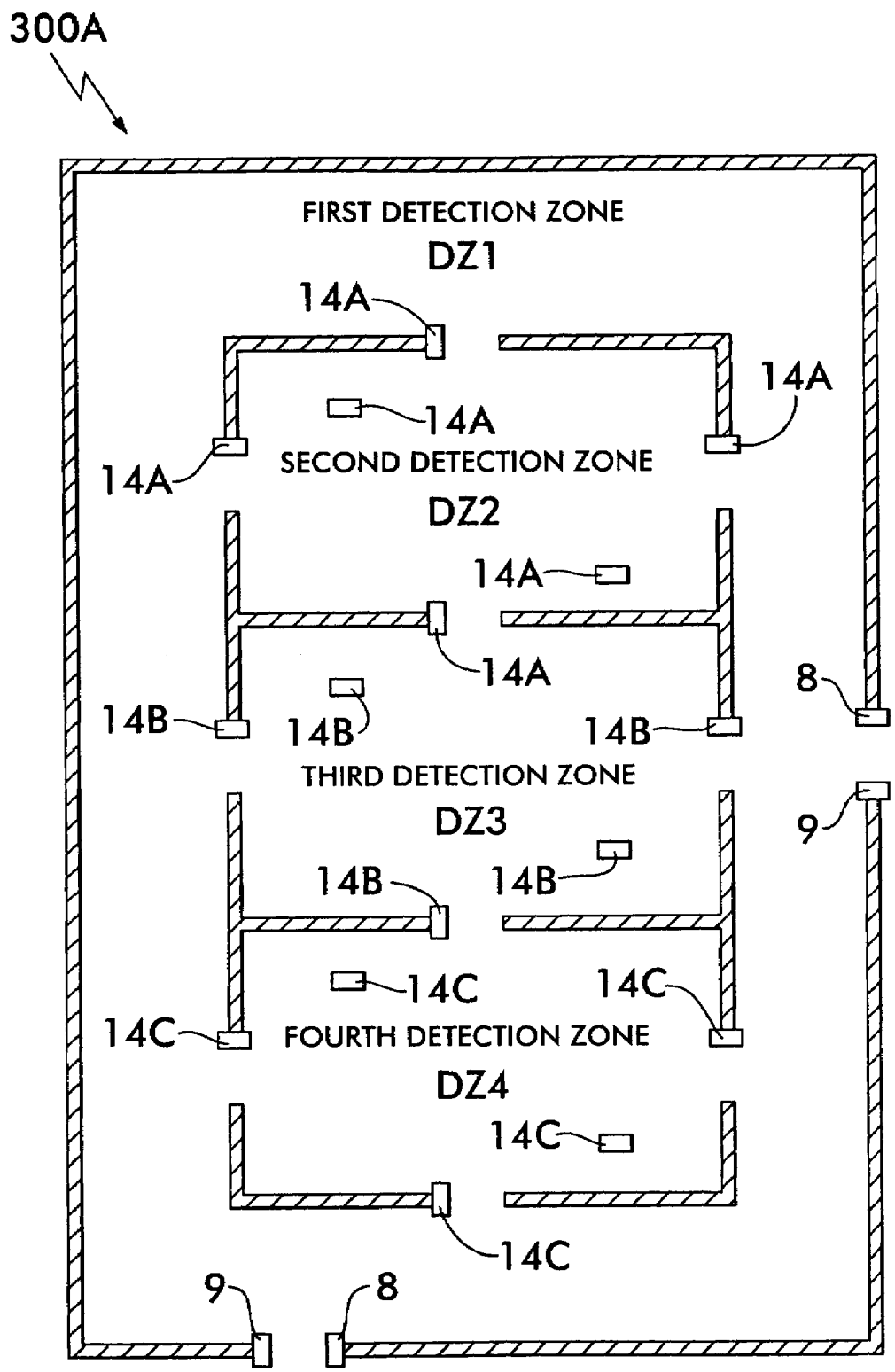
Figure 5:
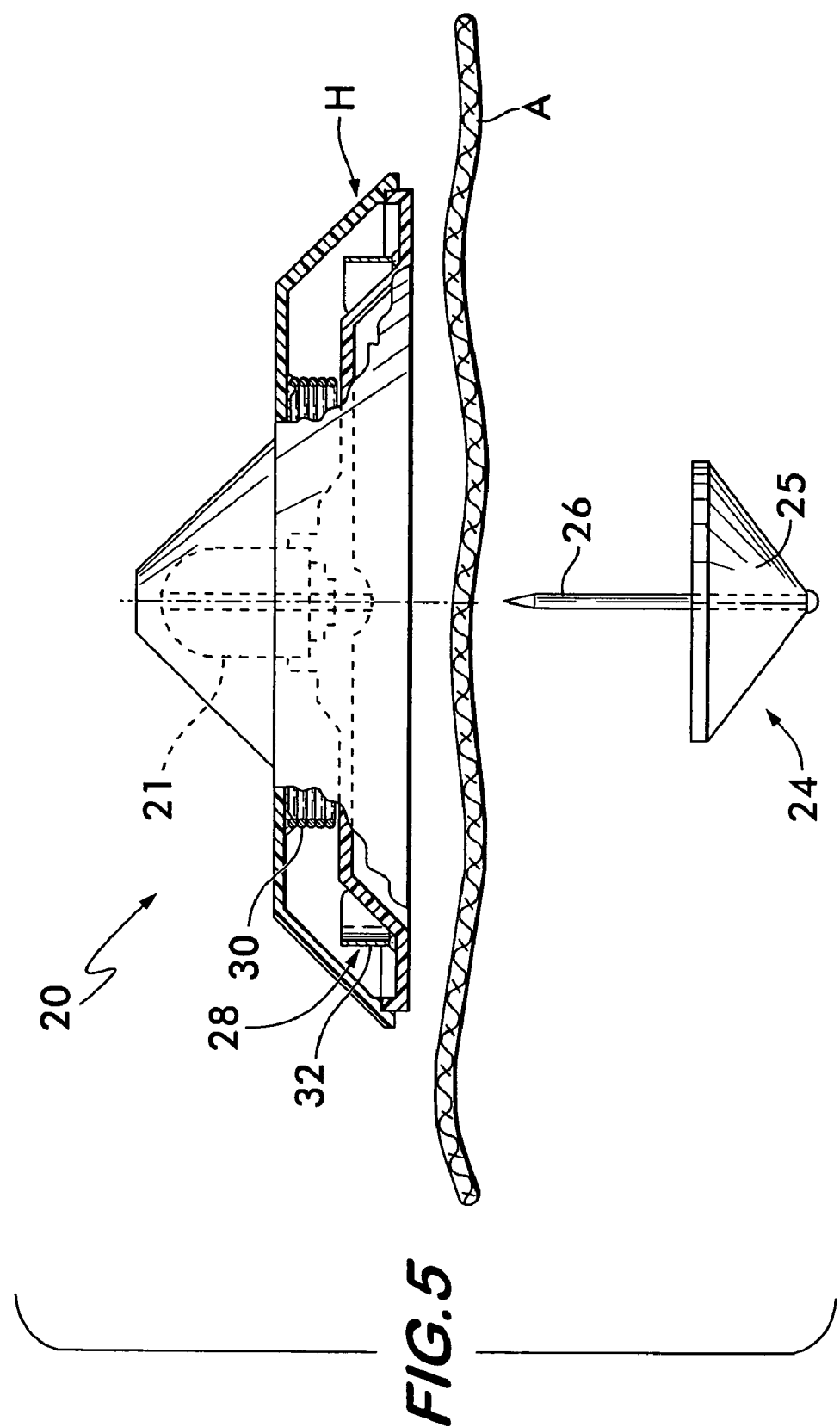
Figure 6:
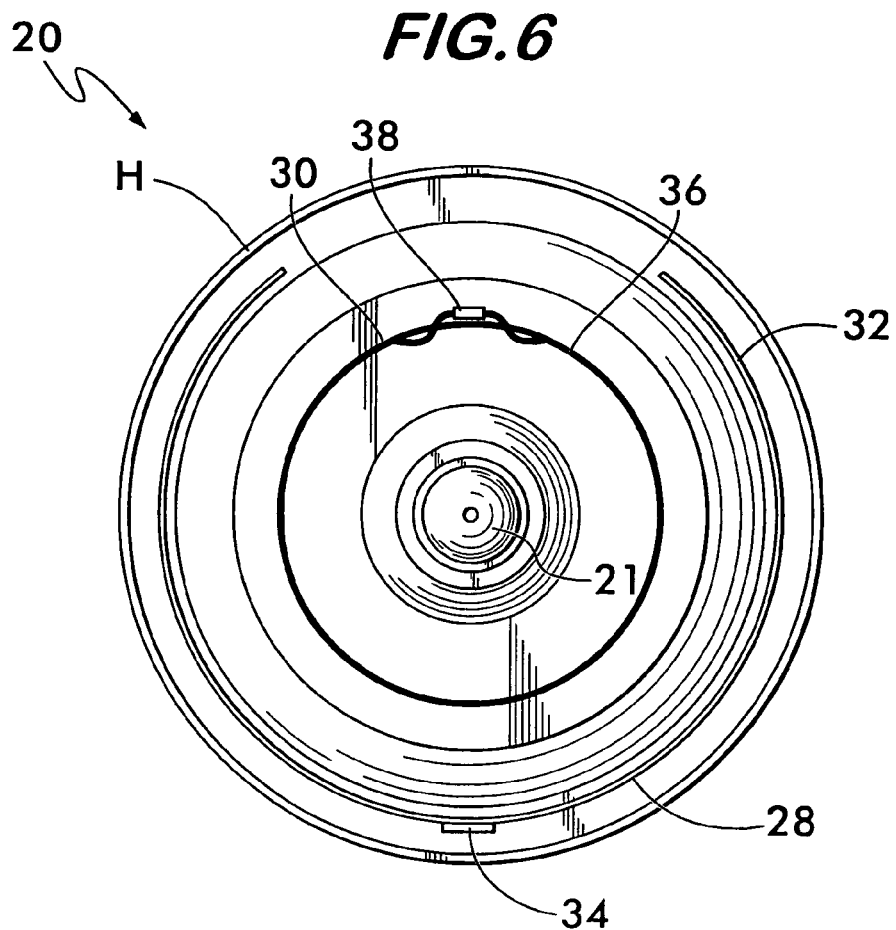
Figure 7:
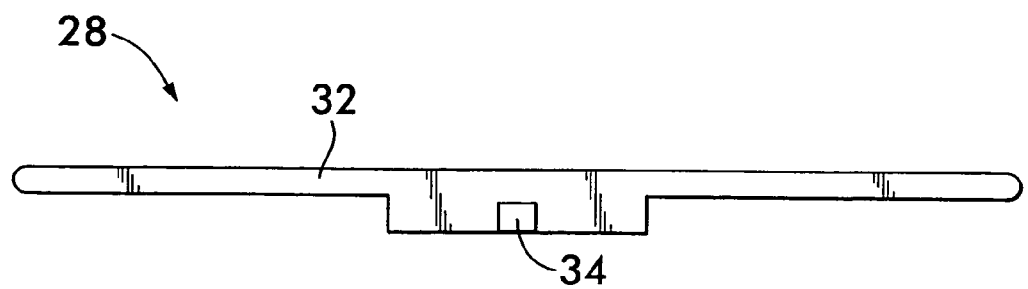
Figure 8:
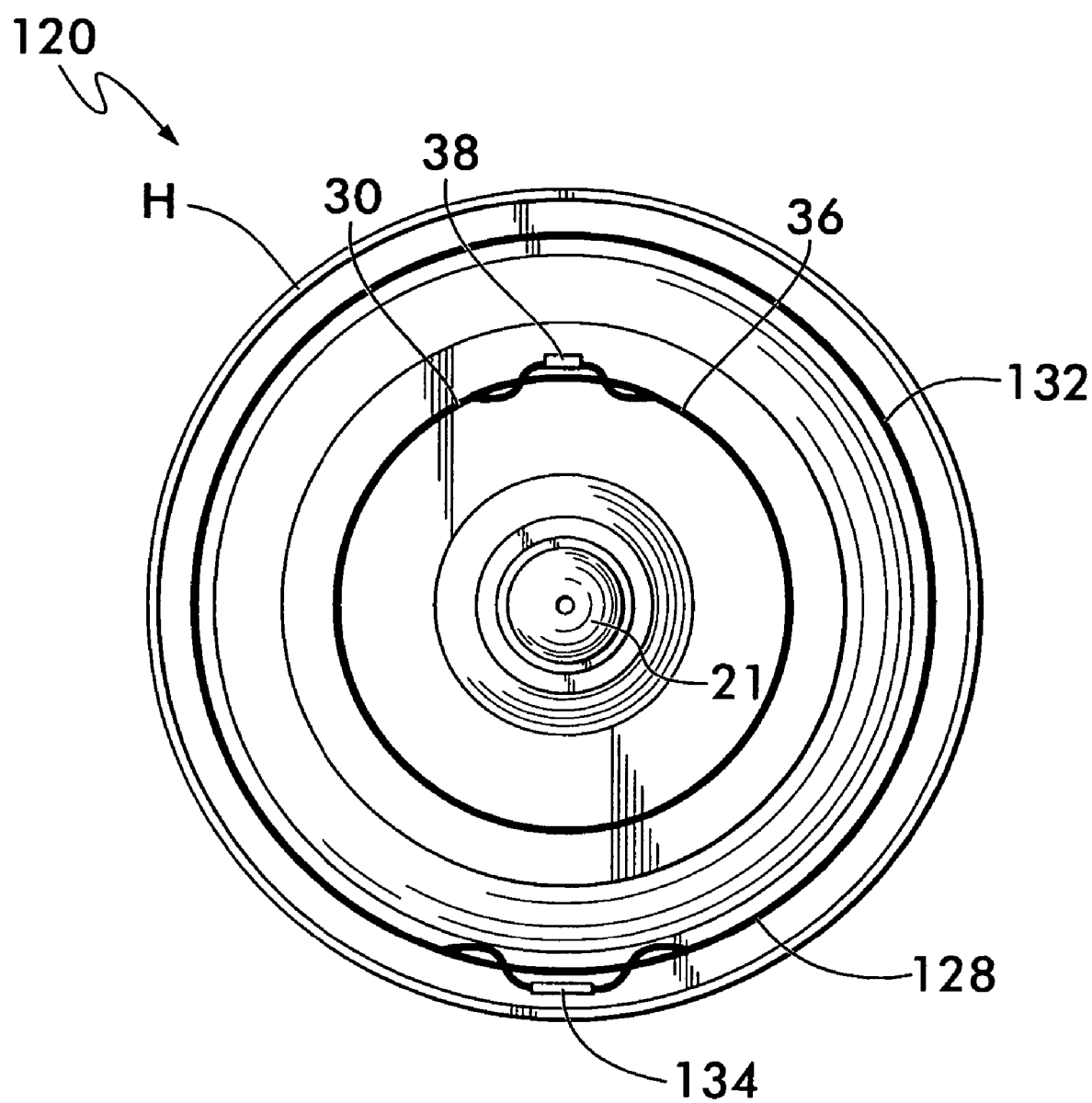
Figure 9:
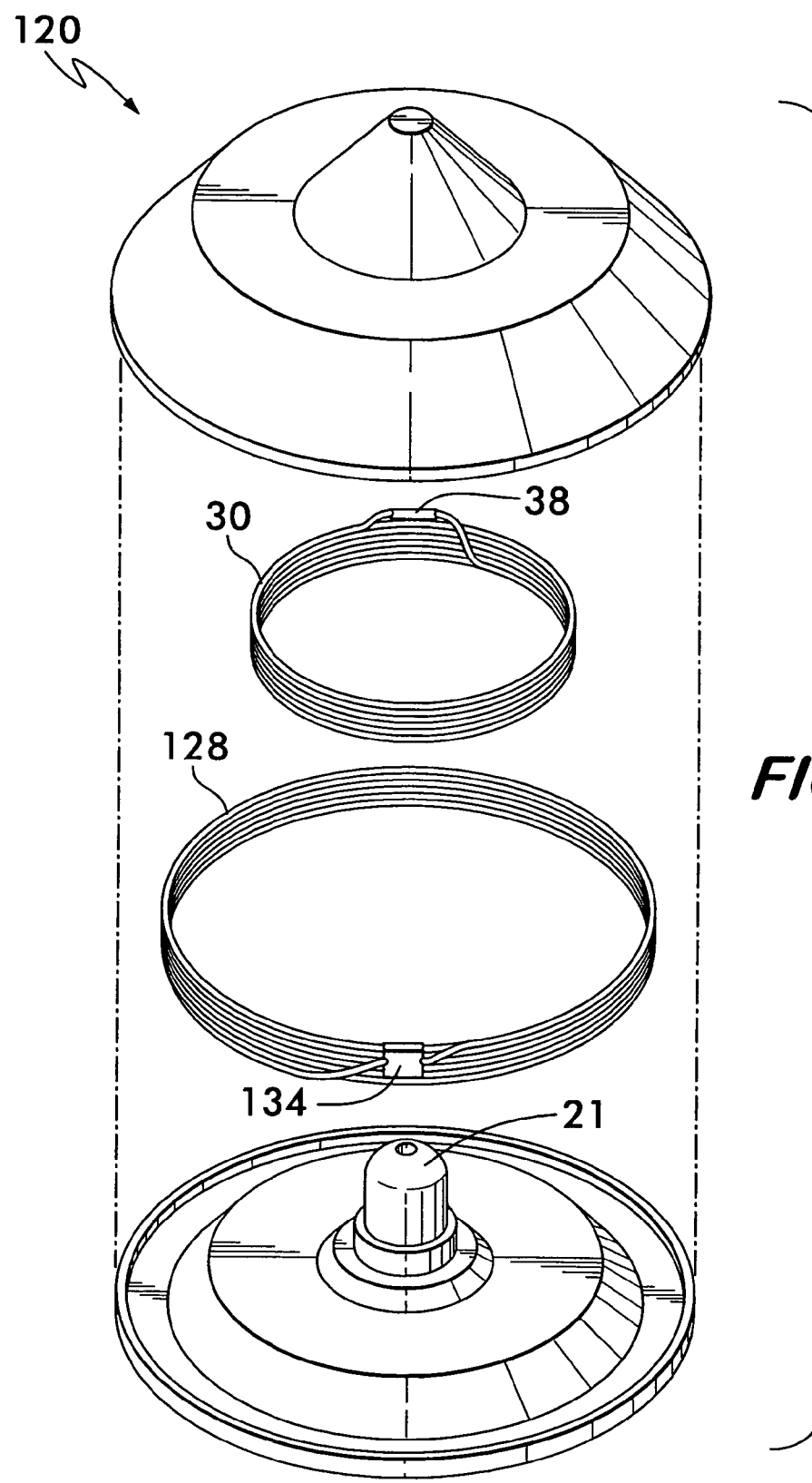
Figure 10A:
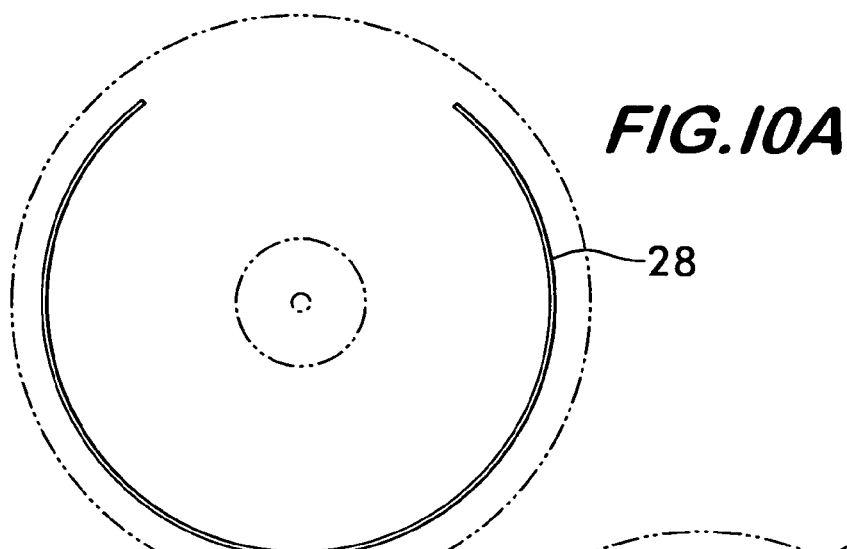
Figure 10B:
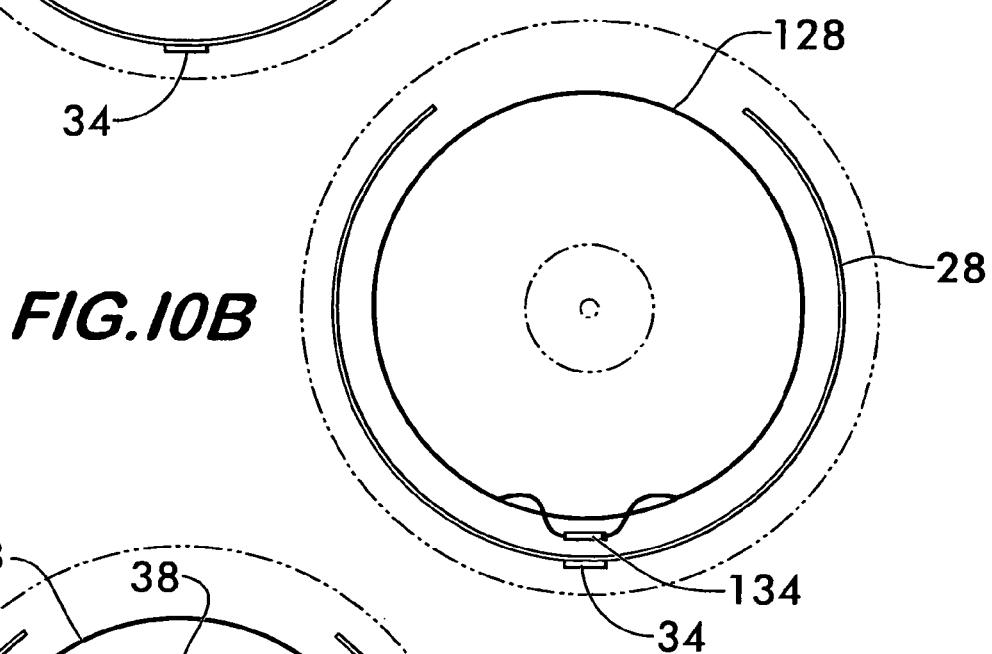
Figure 10C:
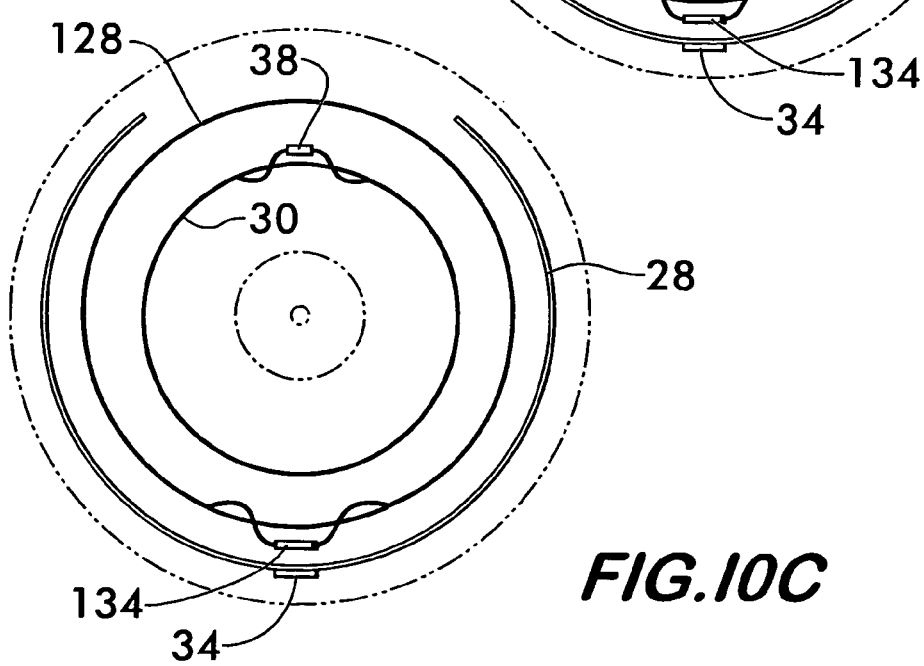
Figure 11:
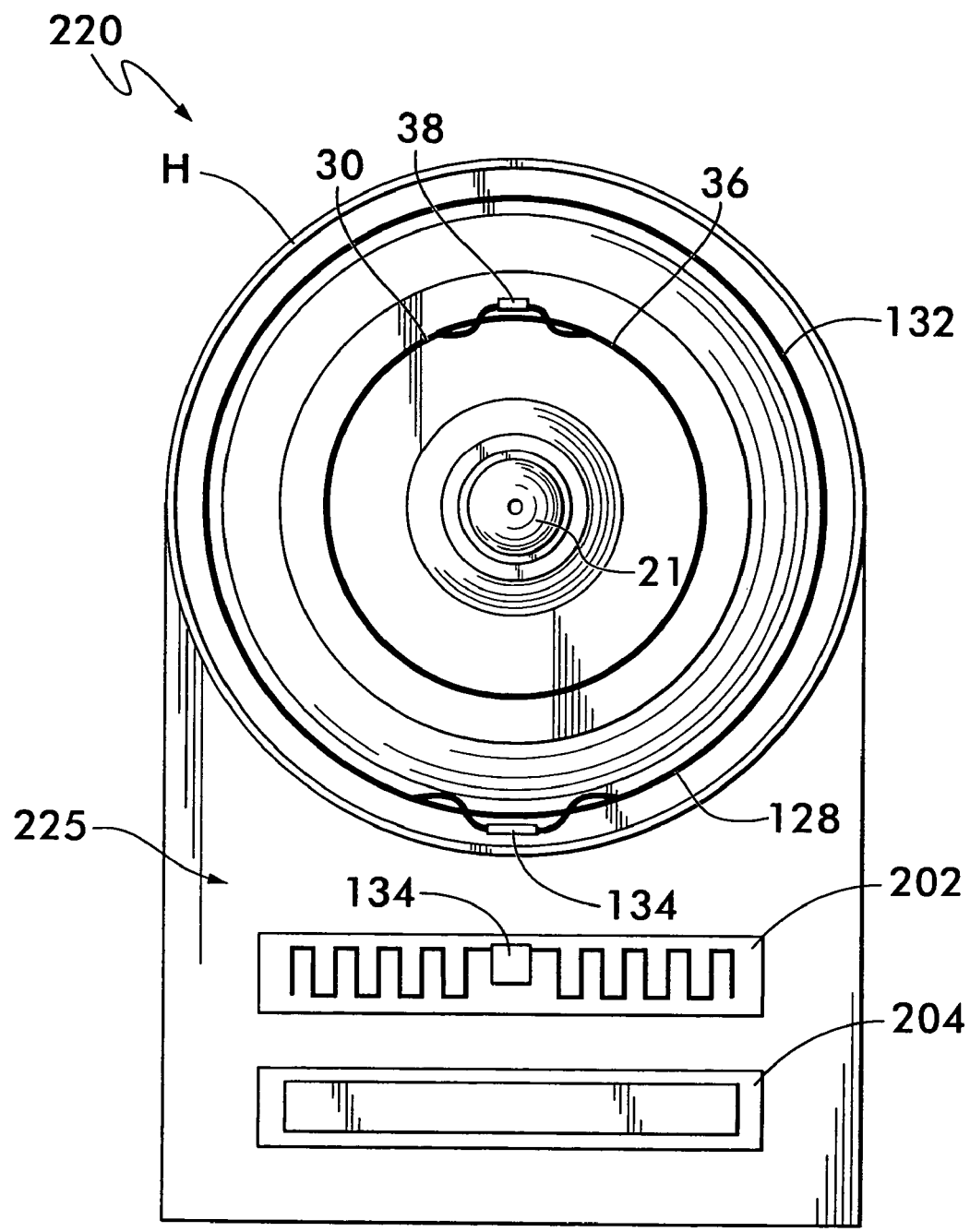

FIG. 4 is a functional diagram of the hard tag of the present invention;

FIG. 4A is a plan view of an environment depicting an exemplary two zone tag detection system;

FIG. 4B is a plan view of an environment depicting another exemplary plural zone tag detection system;

FIG. 5 depicts a first embodiment of the present invention for a combined EAS and RFID hard tag shown in partial cross-section and exploded to show how it is attached to an article;

FIG. 6 is a top plan view of a first embodiment, with the top portion of the housing removed, to show the EAS element and the RFID element positioned inside the lower portion of the housing;

FIG. 7 depicts the RFID element of the present invention showing the RFID IC and the dipole antenna;

FIG. 8 is a top plan view of a second embodiment, with the top portion of the housing removed, to show the EAS element and the RFID element positioned inside the lower portion of the housing;

FIG. 9 is an exploded view of the second embodiment of the present invention, with the detachable portion being omitted;

FIG. 10A is a third embodiment of the present invention hard tag comprising only an RFID element;

FIG. 10B is a fourth embodiment of the present invention hard tag comprising a plurality of RFID elements;

FIG. 10C is a fifth embodiment of the present invention hard tag comprising an EAS element and a plurality of RFID elements; and FIG. 11 is a sixth embodiment of the present invention hard tag depicting plural EAS and plural RFID elements therein.

DETAILED DESCRIPTION OF THE INVENTION

Certain terminology is used herein for convenience only and is not to be taken as a limitation on the present invention. In the drawings, the same reference letters are employed for designating the same elements throughout the several figures.

As will discussed in detail later, the hard tag 20 of the present invention may comprise a variety of combinations of EAS elements and RFID elements. Thus, as shown in FIG. 4, the first element $E_1$ may comprise, for example, an EAS For example, the hard tag 20 may comprise a first EAS element ($E_1$), e.g., a resonant LC circuit, tuned to 8.2 MHz as well as a second EAS element ($E_2$), e.g., an acousto-magnetic (AM) resonating member along with a first RFID element ($E_3$) tuned to 13.56 MHz and a second RFID element ($E_4$) tuned to 915 MHz. Thus, it is within the broadest scope of the present invention 20 to include one or more EAS elements tuned to respective EAS frequencies in combination with one or more RFID elements tuned to respective RFID frequencies.

One of the key features of the present invention is that the EAS/RFID identification hard tag 20 can be used in a plural (i.e., at least two) detection zone system 300. By way of example only, FIG. 4A shows a plan view of an environment (e.g., retail establishment, warehouse, factory, etc.) whose interior is configured for a two-zone detection system: a first detection zone 302 forms an RFID detection zone and a second detection zone 304 forms an EAS detection zone. The RFID detection zone 302 may comprise a plurality of readers 14 distributed within that zone 302 (e.g., in the apparel department) and at the periphery of RFID detection zone 302. Thus, as the person retrieves a tagged article A and moves about the RFID detection zone 302, the article A can be tracked within that zone 302 and as the article A leaves that zone 302 and enters the EAS detection zone 304; the reader 14 can then activate an alarm and/or transmit a status signal or data (e.g., a signal or data including an article identifier, location of article, sales status of article, etc.) to a database. The EAS zone 304 comprises a transmitter 8/receiver 9 pair at the exit(s) to the environment which can detect the presence of the tag 20 on the article A should the person attempt to leave without purchasing, or otherwise legally retaining possession of, the article A; the receiver 9 can then activate an alarm.

FIG. 4B provides another exemplary plural zone detection configuration for another environment (e.g., retail establishment, warehouse, factory, etc.). In this configuration, there are four (again, by way of example only) detection zones DZ1–DZ4. Consequently, the EAS/RFID identification hard tag 20 comprises a corresponding number of elements $E_1$–$E_4$. By way of example only, detection zone DZ1 may comprise an EAS detection zone and detection zones DZ2–DZ4 may comprise RFID detection zones wherein each RFID detection zone DZ2–DZ4 operates in respective RFID frequency ranges. As a result, one of the elements, e.g., $E_1$, in the EAS/RFID identification hard tag 20 would comprise an EAS element and the other three elements, $E_2$–$E_4$, would comprise RFID elements; RFID elements $E_2$–$E_4$ would be tuned to respective RFID frequencies corresponding to the RFID frequencies in the respective RFID detection zones DZ2–DZ4. As shown in FIG. 4B, RFID readers 14A–14C are RFID readers that are tuned to respective RFID frequency ranges. Thus, as the tagged article A moves into, and within, one of the RFID detection zones, the correspondingly-tuned RFID elements can communicate with the respective readers 14A–14C in that respective RFID detection zone.

It should be understood that if the detection zones DZ2–DZ4 were EAS detection zones, instead of RFID detection zones, the respective readers 14A–14C would be replaced with transmitter 8/receiver 9 pairs. Thus, it is within the broadest scope of the present invention 20, to include various EAS/RFID element combinations within the EAS/RFID identification hard tag 20 that can operate within plural zone detection systems 300/300A.

It should be understood that FIGS. 4A–4B are by way of example only. A variety of detection zone/hard tag element combinations are within the scope of the present invention, such as but not limited to: two EAS detection zones with two RFID detection zones/ two EAS elements with two RFID elements; three EAS detection zones with three RFID detection zones/three EAS elements with three RFID elements, etc. The key feature of the present invention is that for every detection zone $DZ_i$, there is a corresponding element $E_i$ in the EAS/RFID identification hard tag 20.

It should also be understood that because of the re-usable characteristic of the EAS/RFID identification hard tag 20, it is within the broadest scope of the invention to include more elements E in the tag 20 than there are detection zones in any one environment. In other words, the number of elements in the tag 20 does not have to correspond to the number of detection zones in any one environment. For example, the hard tag 20 may comprise four elements, each having their own operative frequency in one of the frequency ranges depicted above. Initially, the tag 20 is coupled to an article for use in a first environment where, for example, three detection zones may be used wherein three of the internal elements $E_1$, $E_3$, and $E_4$ correspond to the three detection zone frequencies used in the first environment. Should the article then be transported to another environment where another detection zone using a frequency that corresponds to the second element $E_2$ is operative (or where the second environment also uses another detection zone using another frequency that corresponds to one of the other elements $E_1$, $E_3$ or $E_4$ in the tag 20), then the tag 20 can be used in the second environment. Thus, it is within the broadest scope of the present invention to include other combinations of hard tag elements $E_i$ and detection zones $DZ_i$ that allow the tag 20 to be used among different environments having different operating detection zone frequencies.

FIG. 5 shows the internal elements of an EAS/RFID identification hard tag 20 in accordance with a first embodiment of the present invention. The tag 20 comprises a casing or housing H and further includes a locking mechanism 21 (e.g., a spring-loaded, ball/clutch locking device used in Checkpoint System Inc.'s UFO style hard tags). The EAS/RFID identification hard tag 20 further comprises a detachable portion 24 that includes a head 25 and pin 26 that permits the EAS/RFID identification hard tag 20 to be attached to an article A, as discussed previously. Furthermore, as the number of EAS and/or RFID elements increases, the housing H may include an extension 225 (see FIG. 11) to house the additional elements $E_n$.

By way of example only, as shown most clearly in FIG. 5, the tag 20 comprises an RFID element 28 and an EAS element 30. The RFID element 28 includes a dipole antenna 32 extending around the outer rim of the housing H. A conventional RFID chip 34 is attached to the dipole antenna 32. The RFID chip 34 comprises a memory that is programmed with information associated with the article (e.g., product information such as serial number, price, etc.). One suitable RFID element 28, by way of example only, is a dipole antenna and chip combination available from Matrics, Inc., Columbia, Md., and having part number SDR-001, shown in FIG. 7 (the chip is on the reverse side and thus is not visible in FIG. 7). This part number is an inlay 1D medium strip, by way of example only. The RFID element 28 operates in the RFID UHF band, (850 MHz–950 MHz), e.g., 915 MHz. The EAS element 30 (also, referred to as the "EAS coil" or "inner coil") is of conventional design, and is similar to the EAS resonant circuit in a Checkpoint mini-UFO tag discussed previously. The EAS element 30 has a copper coil 36 and a surface-mounted capacitor 38, and operates in the EAS RF band, (2 MHz–14 MHz), e.g., 8.2 MHz.

As mentioned earlier, UFO and mini-UFO hard tags do not currently have an RFID element 28. The addition of an RFID element 28 to such tags enhances the versatility and functionality of such tags. Certain design considerations must be adhered to for proper functioning of the combined EAS/RFID identification hard tag 20.

First, the relative spacing between the RFID element 28 and the EAS element 30 should be arranged in a particular manner to maximize the detectability performance of both elements. In fact, one or both elements 28/30 of the tag portions may not function at all if the relative spacing is outside of a certain range. FIG. 6 shows one arrangement of portions having a relative spacing there between that has been determined to allow both portions to function in an optimal manner.

Second, the RFID element 28 and the EAS element 30 must be held in position with respect to each other and relative to the locking mechanism 21. That is, there should be no movement of the RFID element 28 with respect to the EAS element 30 (i.e., no floating elements), nor with any elements located in the extension 225. Also, the EAS element 30 should be held "on center" with respect to the central axis of the housing H. Both of these conditions can be met by using any suitable techniques that hold both portions securely in place (e.g., adhesives, etc.) within the housing H, and which do not interfere with the electrical properties of either element.

FIG. 8 shows the internal elements of an EAS/RFID identification hard tag 120 in accordance with a second embodiment of the present invention. The tag 120 is similar to the tag 20, except that the tag 120 has an RFID element 128 made from an RFID coil 132 and an associated RFID chip module 134, and which resonates (operates) in the RFID RF band (2 MHz–14 MHz) e.g., 13.56 MHz. The RFID element 128 in FIG. 8 may also be referred to as the "RFID coil" or "outer coil".

FIG. 9 shows the tag 128 in an exploded view. By way of example only, the RFID element 128 may be secured to the lower portion of the housing H using an adhesive and the EAS element 30 may be secured to the upper portion of the housing H also using an adhesive, thereby maintaining these two elements at the relative spacing mentioned earlier.

As mentioned earlier, the scope of the present invention (including the first and second embodiments) is not limited to the specific elements described above, and includes other types of RFID elements (including other lengths and widths of dipole antennas), EAS elements, other RF and EAS frequencies, and variations in the housing design.

The preferred embodiment of the present invention provides for a combined EAS/RFID identification hard tag. However, the scope of the present invention also includes at least the following alternative embodiments:

1. A hard tag having only one RFID element (FIG. 10A) such as, but not limited to, those shown previously as RFID elements 28, 128, 202 (microwave), etc. One version of this alternative embodiment merely eliminates the EAS element 30 shown in FIGS. 6, 8 and 9.

2. A hard tag having multiple RFID elements (with different resonant frequencies) such as, but not limited to, those shown previously as RFID elements 28, 128, 202 (microwave), etc., with an EAS element (FIG. 10B), or without an EAS element (FIG. 10C).

Figure 1:
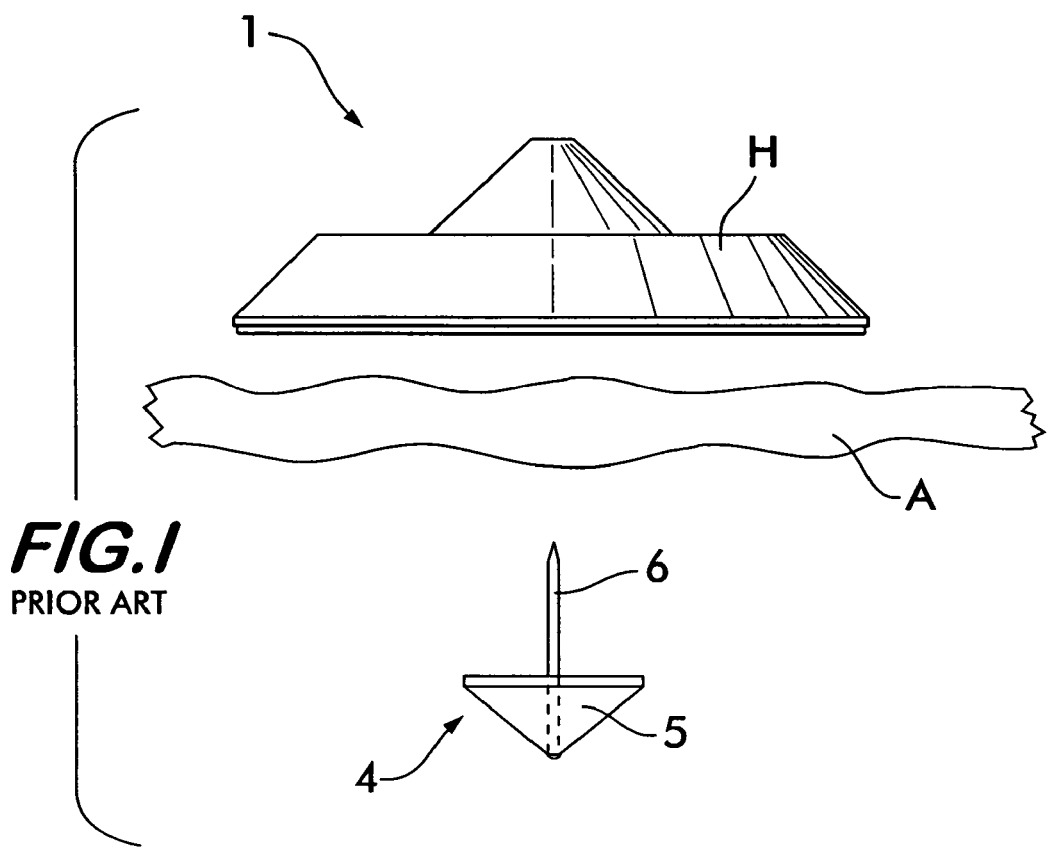
FIG. 1 depicts a prior art re-usable EAS hard tag attached to an article.
Figure 2:
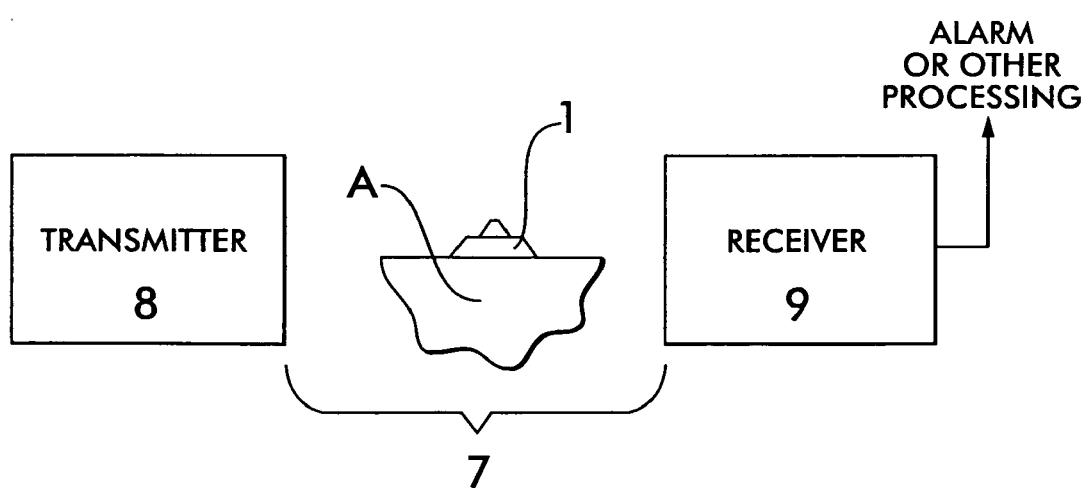
FIG. 2 depicts a prior art transmitter/receiver system for an EAS tag.
Figure 3:
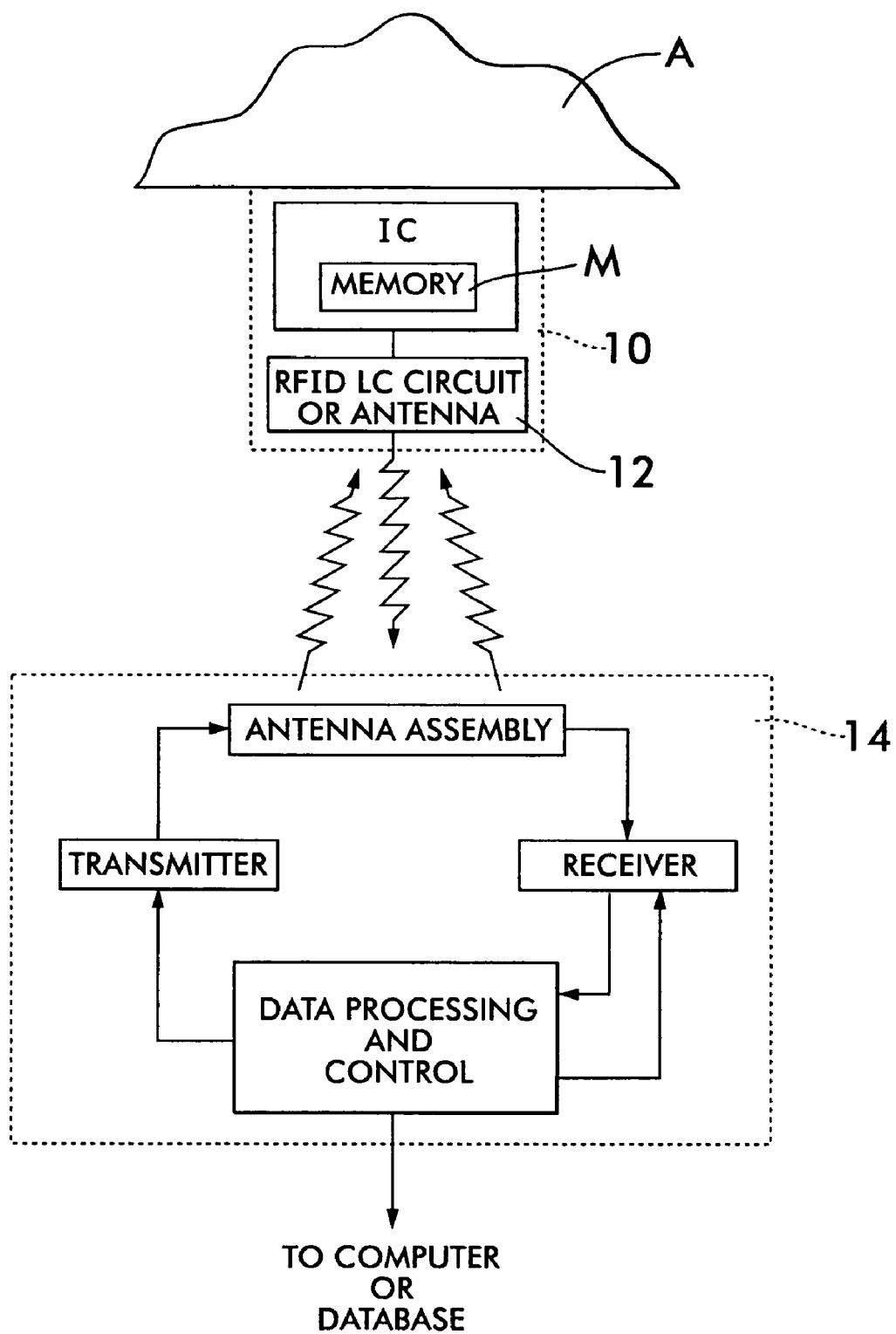
FIG. 3 depicts a prior art RFID tag reader system.
Figure 3A:
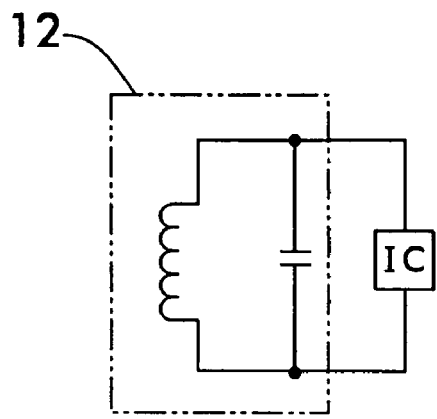
FIG. 3A depicts an exemplary resonant circuit forming part of an RFID element.
Figure 3B:
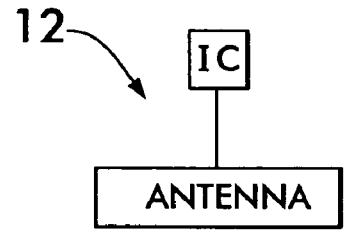
FIG. 3B depicts an exemplary antenna forming a part of an RFID element.

3. A hard tag having plural EAS elements and plural RFID elements, as shown in FIG. 11. In particular, the hard tag may comprise the extension 225 to house a microwave element 202 as well as an acousto-magnetic (AM) element 204 (e.g., magneto-restrictive element in combination with a magnetic bias strip—see FIG. 1). Thus, the plural EAS elements are formed by the coil 36/capacitor 38 and the AM element 204, while the RFID elements are formed by the RFID IC 34/coil 132 and the microwave element 202. Similarly, although not shown, a low frequency (LF) element, similar to the AM element but which provides an harmonic response in the LF band, can be disposed in the extension 225 to provide EAS operation in the LF frequency range.

4. A hard tag having multiple EAS elements (with different resonant frequencies) and no RFID elements. Thus, by way of example, a hard tag may include the coil 36/capacitor 38 circuit along with the acousto-magnetic element 204, thereby forming an EAS hard tag with at least two EAS operative frequencies.

It will be appreciated by those skilled in the art that changes could be made to the embodiments described above without departing from the board inventive concept thereof. It is understood, therefore, that this invention is not limited to the particular embodiments disclosed, but it is intended to cover modifications within the spirit and scope of the present invention.

What is claimed is:

1. An identification tag adapted for use with an article, said identification tag comprising:
 a housing comprising at least two radio frequency identification (RFID) elements, each having an RFID integrated circuit comprising a memory containing information associated with the article, and wherein each one of said pair of RFID elements comprises a respective resonant circuit or antenna tuned to a respective RF frequency; and
 wherein each of said RFID elements emits a respective detectable signal when subjected to a respective electromagnetic field corresponding to one of said respective RF frequencies.

2. The identification tag of claim 1 wherein each one of said respective RF frequencies is selected from a different group of RF frequencies, said different groups of RF frequencies comprises a first group defined as approximately 2 MHz–14 MHz, a second group defined as approximately 850 MHz–950 MHz; and a third group defined as approximately 2.3 GHz–2.6 GHz.

3. The identification tag of claim 2 wherein each of said respective detectable signals comprises said information associated with the article.

4. The identification tag of claim 1 wherein said housing further comprises:
 a detachable portion;
 a releasable securement mechanism for releasably securing said housing and said detachable portion together and for securing said identification tag to the article.

5. An identification tag adapted for use with an article, said identification tag comprising:
 a housing comprising:
  a radio frequency identification (RFID) element said RFID element comprises either a resonant circuit tuned to a first RF frequency or an antenna tuned to a second RF frequency, different from said first RF frequency, said RFID element comprising an integrated circuit comprising a memory containing information associated with the article;
  a detachable portion;
  a releasable securement mechanism for releasably securing said housing and said detachable portion together and for securing said identification tag to the article; and
 wherein said RFID element emits a respective detectable signal when subjected to an electromagnetic field corresponding to said first or second RF frequency, said respective detectable signal containing said information associated with the article.

6. The identification tag of claim 5 wherein said RFID resonant circuit is tuned to a frequency of approximately 2 MHz–14 MHz.

7. The identification tag of claim 5 wherein said RFID antenna is a dipole antenna tuned to a frequency of approximately 850 MHz–950 MHz.

8. The identification tag of claim 5 wherein said RFID antenna is a dipole antenna tuned to a frequency of approximately 2.3 GHz–2.6 Ghz.

9. A system for detecting a re-usable identification tag in an environment, said system comprising:
 at least one re-usable identification tag having at least two elements tuned to respective frequencies and wherein said at least one re-usable identification tag is coupled to an article, said first element emitting a first detectable signal when subjected to an electromagnetic field of a first frequency and said second element emitting a second detectable signal when subjected to an electromagnetic field of a second frequency different from said first frequency;
 a first detection zone within the environment comprising at least a first transmitter that emits an electromagnetic field of said first frequency and at least a first receiver that detects said first detectable signal when said at least one re-usable identification tag is present at said first detection zone, said first receiver being coupled to an alarm or a database; and
 a second detection zone within the environment comprising at least a second transmitter that emits an electromagnetic field of said second frequency and at least a second receiver that detects said second detectable signal when said at least one re-usable identification tag is present at said second detection zone, said second receiver being coupled to an alarm or a database.

10. The system of claim 9 wherein said first frequency is a frequency between approximately 2 MHz–14 MHz.

11. The system of claim 9 wherein said first frequency is a frequency between approximately 850 MHz–950 MHz.

12. The system of claim 9 wherein said first frequency is a frequency between approximately 2.3 GHz–2.6 Ghz.

13. The system of claim 9 wherein said first frequency is a frequency between approximately 50 kHz–70 kHz.

14. The system of claim 9 wherein said first frequency is a frequency between approximately 5 kHz–14 kHz.

15. The system of claim 9 wherein said second frequency is a frequency between approximately 2 MHz–14 MHz.

16. The system of claim 9 wherein said second frequency is a frequency between approximately 850 MHz–950 MHz.

17. The system of claim 9 wherein said second frequency is a frequency between approximately 2.3 GHz–2.6 GHz.

18. The system of claim 9 wherein said second frequency is a frequency between approximately 50 kHz–70 kHz.

19. The system of claim 9 wherein said second frequency is a frequency between approximately 5 kHz–14 kHz.

20. The system of claim 9 wherein said at least two elements may comprise a pair of radio frequency identification (RFID) elements each having an RFID integrated circuit comprising a memory containing information associated with the article, and wherein one of said pair of RFID elements comprises a respective resonant circuit or antenna tuned to said first frequency and wherein the other one of said pair of RFID elements comprises a respective resonant circuit or antenna tuned to said second frequency.

21. The system of claim 9 wherein said at least two elements may comprise a pair of electronic article surveillance (EAS) elements and wherein one of said pair of EAS elements is tuned to said first frequency and wherein the other one of said pair of EAS elements is tuned to said second frequency.

22. The system of claim 9 wherein said at least two elements may comprise one radio frequency identification element (RFID) element and one electronic article surveillance (EAS) element, said RFID element comprising an RFID integrated circuit comprising a memory containing information associated with the article, and further comprising a resonant circuit or antenna tuned to said first frequency and wherein said EAS element is tuned to said second frequency.

23. A method for detecting a re-usable identification tag, said method comprising the steps of:
   providing at least one re-usable identification tag having at least two elements tuned to respective frequencies and wherein said at least one re-usable identification tag is coupled to an article, said first element emitting a first detectable signal when subjected to an electromagnetic field of a first frequency and said second element emitting a second detectable signal when subjected to an electromagnetic field of a second frequency different from said first frequency;
   detecting said first detectable signal by at least a first receiver whenever said at least one re-usable identification tag is at a first detection zone and emits said first detectable signal when at least a first transmitter emits an electromagnetic field of said first frequency in said first detection zone;
   activating an alarm by, or transmitting a status signal or data to a database from, said first receiver when said first detectable signal is detected;
   detecting said second detectable signal by at least a second receiver whenever said at least one re-usable identification tag is at a second detection zone and emits said second detectable signal when at least a second transmitter emits an electromagnetic field of said second frequency in said second detection zone; and activating said alarm by, or transmitting a status signal or data to said database from, said second receiver when said second detectable signal is detected.

24. The method of claim 23 wherein said first frequency is a frequency between approximately 2 MHz–14 MHz.

25. The method of claim 23 wherein said first frequency is a frequency between approximately 850 MHz–950 MHz.

26. The method of claim 23 wherein said first frequency is a frequency between approximately 2.3 GHz–2.6 GHz.

27. The method of claim 23 wherein said first frequency is a frequency between approximately 50 kHz–70 kHz.

28. The method of claim 23 wherein said first frequency is a frequency between approximately 5 kHz–14 kHz.

29. The method of claim 23 wherein said second frequency is a frequency between approximately 2 MHz–14 MHz.

30. The method of claim 23 wherein said second frequency is a frequency between approximately 850 MHz–950 MHz.

31. The method of claim 23 wherein said second frequency is a frequency between approximately 2.3 GHz–2.6 Ghz.

32. The method of claim 23 wherein said second frequency is a frequency between approximately 50 kHz–70 kHz.

33. The method of claim 23 wherein said second frequency is a frequency between approximately 5 kHz–14 kHz.

34. The method of claim 23 wherein said at least two elements may comprise a pair of radio frequency identification (RFID) elements each having an RFID integrated circuit comprising a memory containing information associated with the article, and wherein one of said pair of RFID elements comprises a respective resonant circuit or antenna tuned to said first frequency and wherein the other one of said pair of RFID elements comprises a respective resonant circuit or antenna tuned to said second frequency.

35. The method of claim 23 wherein said at least two elements may comprise a pair of electronic article surveillance (EAS) elements and wherein one of said pair of EAS elements is tuned to said first frequency and wherein the other one of said pair of EAS elements is tuned to said second frequency.

36. The method of claim 23 wherein said at least two elements may comprise one radio frequency identification element (RFID) element and one electronic article surveillance (EAS) element, said RFID element comprising an RFID integrated circuit comprising a memory containing information associated with the article, and further comprising a resonant circuit or antenna tuned to said first frequency and wherein said EAS element is tuned to said second frequency.

37. A system for detecting a re-usable identification tag in at least two environments, said system comprising:
   at least one re-usable identification tag having at least two elements tuned to respective frequencies and wherein said at least one re-usable identification tag is coupled to an article, said first element emitting a first detectable signal when subjected to an electromagnetic field of a first frequency and said second element emitting a second detectable signal when subjected to an electromagnetic field of a second frequency different from said first frequency;
   a first detection zone within a first environment comprising at least a first transmitter that emits an electromagnetic field of said first frequency and at least a first receiver that detects said first detectable signal when said at least one re-usable identification tag is present at said first detection zone, said first receiver being coupled to an alarm or a database; and a second detection zone within the second environment comprising at least a second transmitter that emits an electromagnetic field of said second frequency and at least a second receiver that detects said second detectable signal when said at least one re-usable identification tag is present at said second detection zone, said second receiver being coupled to an alarm or a database.

38. The system of claim 37 wherein said first environment comprises a third detection zone having an operative frequency and wherein said at least one re-usable identification tag comprises a third element tuned to said operative frequency.

39. The system of claim 38 wherein said second environment comprises a fourth detection zone having another operative frequency and wherein said at least one re-usable identification tag comprises a fourth element tuned to said another operative frequency.

40. A method for detecting a re-usable identification tag with at least two environments, said method comprising the steps of:

providing at least one re-usable identification tag having at least two elements tuned to respective frequencies and wherein said at least one re-usable identification tag is coupled to an article, said first element emitting a first detectable signal when subjected to an electromagnetic field of a first frequency and said second element emitting a second detectable signal when subjected to an electromagnetic field of a second frequency different from said first frequency;

detecting said first detectable signal by at least a first receiver whenever said at least one re-usable identification tag is at a first detection zone of a first environment and emits said first detectable signal when at least a first transmitter emits an electromagnetic field of said first frequency in said first detection zone;

activating an alarm by, or transmitting a status signal or data to a database from, said first receiver when said first detectable signal is detected;

detecting said second detectable signal by at least a second receiver whenever said at least one re-usable identification tag is at a second detection zone in a second environment and emits said second detectable signal when at least a second transmitter emits an electromagnetic field of said second frequency in said second detection zone; and activating said alarm by, or transmitting a status signal or data to said database from, said second receiver when said second detectable signal is detected.

41. The method of claim 40 wherein said first environment comprises a third detection zone having an operative frequency and wherein said at least one re-usable identification tag comprises a third element tuned to said operative frequency.

42. The method of claim 40 wherein said second environment comprises a fourth detection zone having another operative frequency and wherein said at least one re-usable identification tag comprises a fourth element tuned to said another operative frequency.

* * * * *